United States Patent [19]

Kikuchi

[11] Patent Number: 5,430,280
[45] Date of Patent: Jul. 4, 1995

[54] PASSAGE TICKET PROCESSING APPARATUS

[75] Inventor: Yutaka Kikuchi, Tokyo, Japan

[73] Assignee: Kabushiki Kaisha Toshiba, Kawasaki, Japan

[21] Appl. No.: 190,352

[22] Filed: Feb. 1, 1994

[30] Foreign Application Priority Data

Feb. 2, 1993 [JP] Japan .................. 5-015671

[51] Int. Cl.$^6$ ............................................. G06K 7/08
[52] U.S. Cl. .................. 235/449; 235/384; 235/441; 271/246
[58] Field of Search ............ 235/449, 481, 476, 384, 235/475, 379; 271/182, 246, 256, 272

[56] References Cited

U.S. PATENT DOCUMENTS

| 3,636,316 | 1/1972 | Suzuki et al. ............ 235/481 X |
| 3,646,323 | 2/1972 | Young et al. ............. 235/481 X |
| 3,840,223 | 10/1974 | Nakata ..................... 271/272 X |
| 4,493,103 | 1/1985 | Yamashita et al. ........ 235/384 X |
| 4,571,489 | 2/1986 | Watanabe ................. 235/379 X |
| 4,608,488 | 8/1986 | Hirose et al. ................ 235/384 |
| 4,988,853 | 1/1991 | Nagashima et al. ........ 235/449 X |
| 4,988,854 | 1/1991 | Mita .......................... 235/476 |
| 4,992,647 | 2/1991 | Konishi et al. ............ 235/384 X |
| 5,072,102 | 12/1991 | Kruse ........................ 235/441 |
| 5,157,246 | 10/1992 | Nakanishi .................. 235/449 X |
| 5,225,665 | 7/1993 | Zerfahs et al. .............. 235/384 |
| 5,255,906 | 10/1993 | Ballard et al. ............... 271/246 |

FOREIGN PATENT DOCUMENTS

| 62-290988 | 12/1987 | Japan .................. 235/441 |
| 3-257598 | 11/1991 | Japan .................. 235/384 |

Primary Examiner—Donald T. Hajec
Assistant Examiner—Michael G. Lee
Attorney, Agent, or Firm—Cushman, Darby & Cushman

[57] ABSTRACT

A passage ticket is conveyered while being sandwiched between conveyer belts, and brought into contact with a rolling element. The passage ticket is held stationary by a stopper whose top end portion is positioned at a conveyer path. A solenoid is operated based on a command for releasing the-holding state, so that the rolling element is rolled. Therefore, the stopper is removed from-the conveyer path, and a pressing roller coupled to the rolling element is pressed onto the conveyer belts. As a result, the passage ticket is surely conveyed as being sandwiched between the conveyer belts when the holding state is released. Therefore, even if erroneous data is contained in the passage ticket issued at an entrance gate, erroneous data can be rapidly corrected at an exit gate.

13 Claims, 5 Drawing Sheets

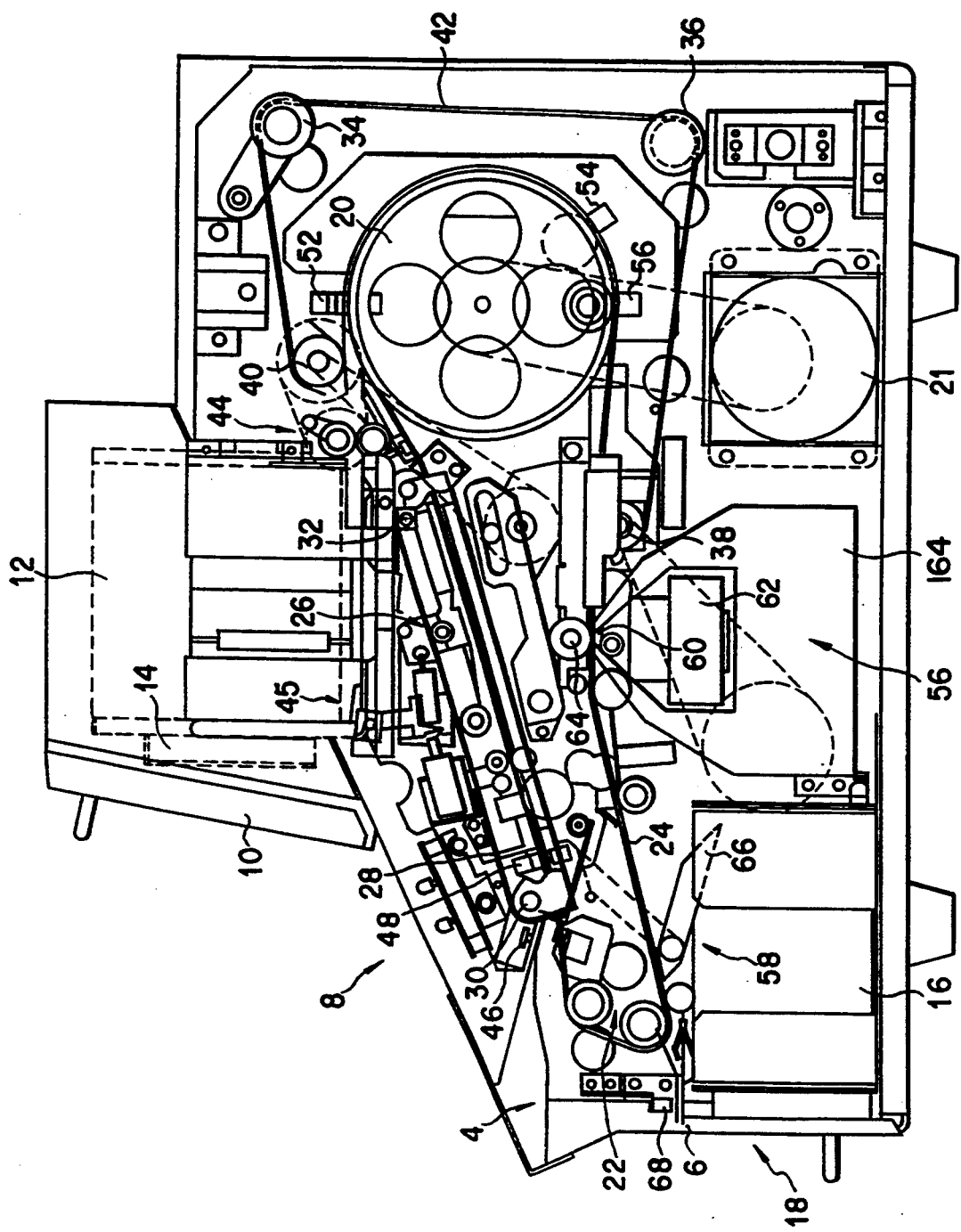
F I G. 1

PASSAGE TICKET PROCESSING APPARATUS

BACKGROUND OF THE INVENTION

1. Field of the Invention

The present invention relates to a passage ticket processing apparatus and more particularly to an apparatus for processing a passage ticket of a toll road to issue the passage ticket, which is used in collecting a toll.

2. Description of the Related Art

Conventionally, there has been put to practice use a passage ticket processing apparatus, which is provided at an exit gate such as, a toll collecting apparatus. The passage ticket apparatus reads a passage ticket, e.g., a magnetic passage ticket, delivered to a driver at an entrance gate to collect the toll. In such a system, a ticket issuing machine for issuing a passage ticket, serving as a passage ticket processing apparatus, is provided at the entrance gate. Also, a ticket confirming machine for confirming a passage ticket, serving as a passage ticket processing apparatus, is provided at the exit gate. Generally, car type data of the vehicle to enter is discriminated by a clerk in charge at the entrance gate. The car type data is recorded in the passage ticket as magnetic data by the ticket issuing machine. Then, the ticket in which car type data is recorded is delivered to the driver of the vehicle. A clerk in charge at the exit gate receives the passage ticket from the driver. The received passage ticket is inserted into the ticket confirming machine, and the toll is calculated based on the type of the vehicle, and the traveling distance from the entrance gate, thereby collecting the toll.

In the conventional passage ticket processing system, car type data recorded at the entrance gate is read by the confirming machine provided at the exit gate. Then, the clerk at the exit gate discriminates whether or not recorded data is correct. If it is correct, the toll to be collected is calculated.

In recent years, as the types of the developed vehicles have been increased in number, the classification of the car type is subdivided, and complicated, so that it takes much time to discriminate car type data of the vehicle. In addition, there often occurs a problem in which the clerk at the entrance gate records erroneous car type data in the passage ticket, and the clerk at the exit gate finds out such an input error.

When the clerk at the exit gate finds an input error in car type data after inserting the passage ticket into the confirming machine, the passage ticket is once discharged from the passage ticket processing apparatus, and the function as a confirming machine of the passage ticket processing apparatus is changed to the function as an issuing machine so as to record correct car type data onto the passage ticket. Thereafter, the toll is calculated based on correct data, and the toll is collected. In processing the passage ticket in which such erroneous data is recorded, the complicated procedures such as the discharge of the passage ticket and the reinsertion of the passage ticket are required, and there is a problem in that efficiency of processing at the exit gate worsens.

In order to deal with the above problem, Japanese patent application No. 2-288559 already proposes a holding mechanism for holding the passage ticket unmoved in which an eccentric roller and a stopper are combined (hereinafter called as escrow mechanism). However, in the escrow mechanism, the passage ticket cannot be surely pressed to a conveyer belt due to the use of the eccentric roller, and a transfer delay occurs when the holding state of the passage ticket is released, so that a reading or writing error occurs.

SUMMARY OF THE INVENTION

An object of the present invention is to provide a ticket processing apparatus, which can rapidly correct erroneous data at an exit gate even if erroneous data is contained in the passage ticket issued at an entrance gate.

According to the present invention, there can be provided an apparatus for conveying a medium, comprising: a conveyance mechanism having a pair of conveyer belts, the conveyance mechanism conveying the medium along a predetermined conveyance path by holding the medium between the conveyer belts; and a rotary member positioned near the conveyance mechanism having a stopper and a pusher spaced apart from each other for a predetermined distance and able to rotate around an axis located between the stopper and the pusher. In this apparatus, the stopper, when entering the conveyance path, stops the medium conveyed by the conveyance mechanism, and the stopper, when retreating from the conveyance path, releases the medium to resume the conveying of the medium, and the pusher pushes the conveyer belts when the stopper retreats from the conveyance path to enhance a tension on the transfer belts.

Also, according to the present invention, there can be provided an apparatus for processing a passage ticket carried by a driver of a vehicle and having vehicle data representing a type of the vehicle, the apparatus comprising: a conveying one mechanism having a pair of conveyer belts for conveying the passage ticket along a predetermined conveyance path, while holding the passage ticket between the conveyer belts; a reading mechanism for reading the vehicle data from the passage ticket conveyed by the conveying mechanism an inputting mechanism for inputting correct data to correct the vehicle data read by the reading mechanism; a rotary member positioned near the conveyance mechanism, having a stopper and a pusher spaced apart from each other for a predetermined distance, the inputting mechanism being able to rotate around an axis located between the stopper and the pusher, the stopper stopping the medium conveyed by the conveying means by entering the conveyance path, and the stopper releasing the medium to resume the conveying the medium by retreating from the conveyance path in response to the input of the inputting mechanism, and the pusher pushing the conveyer belt when the stopper retreats from the conveyance path to enhance a tension on the transfer belts; and a recording mechanism for recording the correct data inputted by the inputting mechanism onto the passage ticket conveyed by the conveying mechanism to correct the vehicle data.

Also, according to the present invention, there can be provided an apparatus for processing a passage ticket issued to a driver of a vehicle and having vehicle data representing a type of the vehicle, the apparatus comprising: a conveying mechanism having a pair of conveyer belts for conveying the passage ticket along a predetermined conveyance path while holding the passage ticket between the conveyer belts; a reading mechanism for reading the vehicle data from the passage ticket conveyed by the conveying mechanism; means for displaying the vehicle data read by the reading mechanism; and inputting mechanism for inputting correct vehicle data to correct vehicle data in accordance with the vehicle data displayed by the displaying mechanism; a rotary member positioned near the conveyance mechanism, having a stopper and a pusher spaced apart from each other for a predetermined distance, and able to rotate around an axis located between the stopper and the pusher, the stopper stopping the medium Conveyed by the conveyance mechanism. When entering the conveyance and the stopper, releasing the medium to resume the conveying the medium when retreating from the conveyance path, and the pusher pushing the conveyer belts to enhance a tension on the transfer belts when the stopper retreats from the conveyance path; control means for retreating the stopper from the conveyance path and for pressing the pusher against the conveyer belts in response to the correct data input by the input mechanism; and mechanism for recording the correct data inputted by the inputting means onto the passage ticket conveyed by the conveying means to correct the vehicle data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a cross sectional view showing a passage ticket processing apparatus of one embodiment of the present invention;

DETAILED DESCRIPTION OF THE PREFERRED EMBODIMENT

An embodiment of the present invention will be explained with reference to the drawings.

Figure 2:
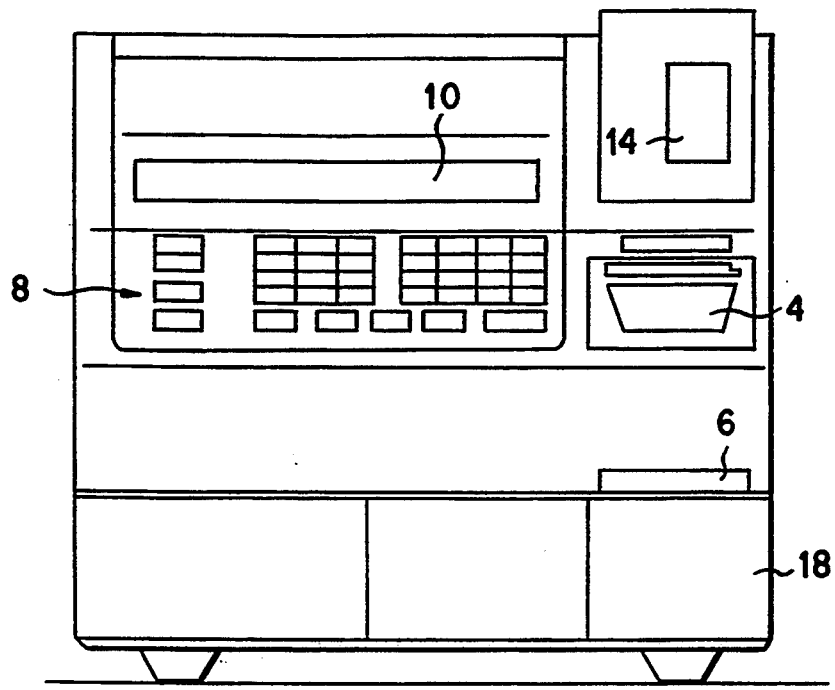
FIG. 2 is a front view of the passage ticket processing apparatus of FIG. 1.

FIG. 1 is a cross sectional view showing a passage ticket processing apparatus of one embodiment of the present invention, and FIG. 2 is a front view of the passage ticket processing apparatus of FIG. 1. The passage ticket processing apparatus operates as an issuing machine for issuing the passage ticket and as a confirming machine for confirming the passage ticket. Here, the following will explain the structure having the function as the confirming machine.

Figure 3:
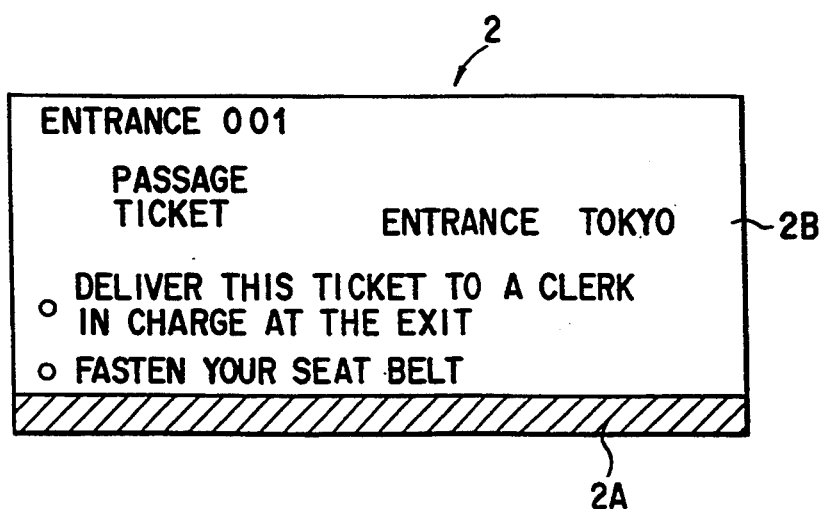
FIG. 3 is a plane view showing a general passage ticket.

As shown in FIGS. 1 and 2, on the front portion of the apparatus, there are formed a passage ticket insertion port 4 into which a passage ticket 2 shown in FIG. 3 is inserted and a passage ticket discharge port 6 from which the passage ticket 2 is discharged. Moreover, on the front portion of the apparatus, there are formed a keyboard 8, a display 10, an input port 14, and an ejecting port 18 for a stacker 16. The keyboard 8 is used to input car type data, a name of a toll gate at which the passage ticket processing apparatus is provided, and ticket data such as payment classification data showing a type of payment e.g., a prepaid card, a sheet of tickets, or cash. The display 10 is used to display the contents of various types of data such as data recorded on the passage ticket and input data inputted by the keyboard. The input port 14 is used to input unused tickets, that is, tickets, in which neither printing record nor magnetic recording is provided, to a hopper 12 at one time. The ejecting port 18 is used to eject the stacker 16 in which used tickets are contained.

A conveyance mechanism for conveyering the passage ticket to the discharge port 6 from the insertion port 4 is incorporated into the apparatus, and a conveyer path is defined by the conveyance mechanism. More specifically, a conveyer drum 20 which is rotated by a main motor 21 when the passage ticket is conveyed is provided on the back surface of the apparatus. A pulley mechanism 22 is provided in the front portion of the apparatus to correspond to the conveyer drum 20. A main conveyer belt 24 is stretched over the conveyer drum 20 and the pulley mechanism 22. An escrow mechanism 26 is provided in a conveyer path formed between the conveyer drum 20 and the insertion port 4. The escrow mechanism 26 temporarily hold the passage ticket unmoved at the position (explained later). In the escrow mechanism 26, an auxiliary belt 28 is provided so as to be stretched over pulleys 30 and 32, and brought into contact with the main belt 24 on the conveyer path. The passage ticket 2 inserted into the insertion port 4 is sandwiched between the main belt 24 and the auxiliary belt 28, and conveyered on the conveyer path. Similarly, pulleys 34, 36, 38, and 40 are provided around the conveyer drum 20. Similarly, an auxiliary belt 42 is stretched over these pulleys 34, 36, 38, and 40, are brought into contact with the main conveyer belt 24 on the conveyer path of the conveyer drum 20 and on the conveyer path of the passage ticket 2 discharged from the conveyer path of the passage ticket 2 discharged from the conveyer drum 20. Therefore, the passage ticket received from the escrow mechanism 26 is conveyed to the discharge port 6 by the main conveyer belt 24 and the auxiliary conveyer belt 42.

In the case that the passage ticket processing apparatus is used as the ticket issuing machine, a large number of unused passage tickets 2 are inputted into a hopper 14 in advance. When the unused passage tickets 2 are issued, the passage tickets 2 are ejected one by one and delivered to the conveyer path between the main conveyer belt 24 and the auxiliary belt 42 by eject and deliver mechanisms 44 and 45. In other words, when a passage ticket 2 is issued, it is directed to the discharge port 6 without passing through the input port 4 and the escrow mechanism 26 in accordance with the input of the keyboard.

On the conveyer path extending from the insertion port 4 to the escrow mechanism 26, there are provided a sensor 46 for detecting the insertion of the passage ticket and a magnetic reading head 48. The sensor 26 detects that the passage ticket 2 is inserted into the insertion port 4. The conveyer belts 24 and 28 start to conveyer the passage ticket in response to the detection of the sensor 26. The magnetic reading head 48 reads magnetic data of the passage ticket 2 from a magnetic recording section 2A. Then, read magnetic data, i.e., data of car type and entrance data, is displayed on the display 10. The passage ticket 2, which is passed through the magnetic reading head 48, is temporarily prohibited from being conveyed by the escrow mechanism 26, and the clerk in charge confirms car type data by the display 10 while the conveyer of the passage ticket 2 is temporarily stopped.

Furthermore, on the conveyer path of the conveyer drum 20, there are provided a sensor 52, a magnetic writing head 54 for writing magnetic data, and a magnetic reading head 56 for confirming magnetic data written in the passage ticket. Generally, the magnetic writing head 54 and the magnetic reading head 56 are often used when the passage ticket processing apparatus is used as a ticket issuing machine for recording magnetic data on the unused passage ticket 2 ejected from the hopper 14. More specifically, the unused passage ticket 2 ejected from the eject mechanism 44 is delivered onto the conveyer path, and the passage of the ticket 2 is detected by a sensor 52. A writing magnetic head 54 makes a writing preparation to the passage ticket 2 in response to a detection signal sent from the sensor 52. Then, car type data, entrance gate data etc. are recorded on the passage ticket 2 when the passage ticket 2 is passed through the magnetic head 54. Prior to the recording, the clerk at the entrance gate inputs car type data etc. by the keyboard 8. The passage ticket 2, which is passed through the magnetic head 54, is passed through the reading magnetic head 54 for confirmation. Here, written data is read, and it is displayed on the display 10 whether or not written data is identified with read data, and written data is confirmed by the clerk.

The magnetic writing head 54 and the magnetic reading head 56 are also operated when the passage ticket processing apparatus is used as a confirming machine. While the passage ticket 2 remains at the escrow mechanism 26, recorded data is displayed on the display 10. If it is discriminated that erroneous data is recorded onto the passage ticket 2, erroneous data is corrected by the magnetic writing head 54 and the magnetic reading head 56. In other words, if the clerk finds out that car type data displayed on the display 10 is different from car type data which he directly confirmed, the clerk inputs corrected data by the keyboard 8. Then, corrected data is sent to the recording head 54, and recorded onto the passage ticket for confirmation similar to the unused passage ticket. The toll, which is calculated based on corrected data, is displayed on the display 10. The clerk receives the toll from the driver based on the display.

A printing mechanism 56 for printing data on the passage ticket 2 and a selecting mechanism 58 for selecting the passage ticket are provided on the conveyer path formed between the main conveyer drum 20 and the discharge port 6. The printing mechanism 56 comprises a sensor 60 for detecting that the passage ticket 2 reaches the printing section, a printing head 62 for printing data on the passage ticket 2 at the printing section, a ribbon cassette 164 for supplying a ribbon to the printing section, and a platen 64 for pressing the ribbon to the passage ticket 2 at the printing section. In the case that the unused passage ticket 2 is supplied to the printing mechanism 56, data of an entrance gate, e.g., "TOKYO" is printed on a printing section 2B. In the case of the confirmed passage ticket 2, "RECEIVED" is printed on the printing section 2B. If a reading error or a writing error occurs and an error still exists in data read by the head 54, the passage ticket 2 is directly passed through the printing mechanism 56 as an unconfirmed passage ticket. The selecting mechanism 58 comprises a flapper 66, which is placed at a first or second position. At the first position, the top end of the flapper 66 is positioned at a stacker 16 such that the passage ticket 2 is prevented from entering the stacker 16 and is positioned to be guided to the discharge port 6. At the second position, the top end of the flapper 66 is leaped up such that the passage ticket 2 is prevented from discharging. Therefore, at the time of issuing the ticket, the position of the flapper 66 is changed to the first position, and the unused passage ticket in which data is already printed is directed to the discharge port 6. Even when the passage ticket is confirmed, there is a case that the flapper 66 is changed to the first position. In other words, when an unconfirmed passage ticket in which an error still exists in data read by the head 54 is issued, the position of the flapper 66 is changed to the first position, and the unconfirmed passage ticket is directed to the discharge port 6. The confirmed passage ticket 2 is stocked in the stacker 16, and other passage tickets 2 are discharged to the discharge port 6. A sensor 68 is provided at the discharge port 6, and detects that the passage ticket 2 reaches the discharge port 6. After the detection, if the passage ticket 2 is discharged from the discharge port 6, the issue of the ticket can be performed for the first time, and insertion of the passage ticket 2 into the insertion port 4 can be performed.

Figure 4:
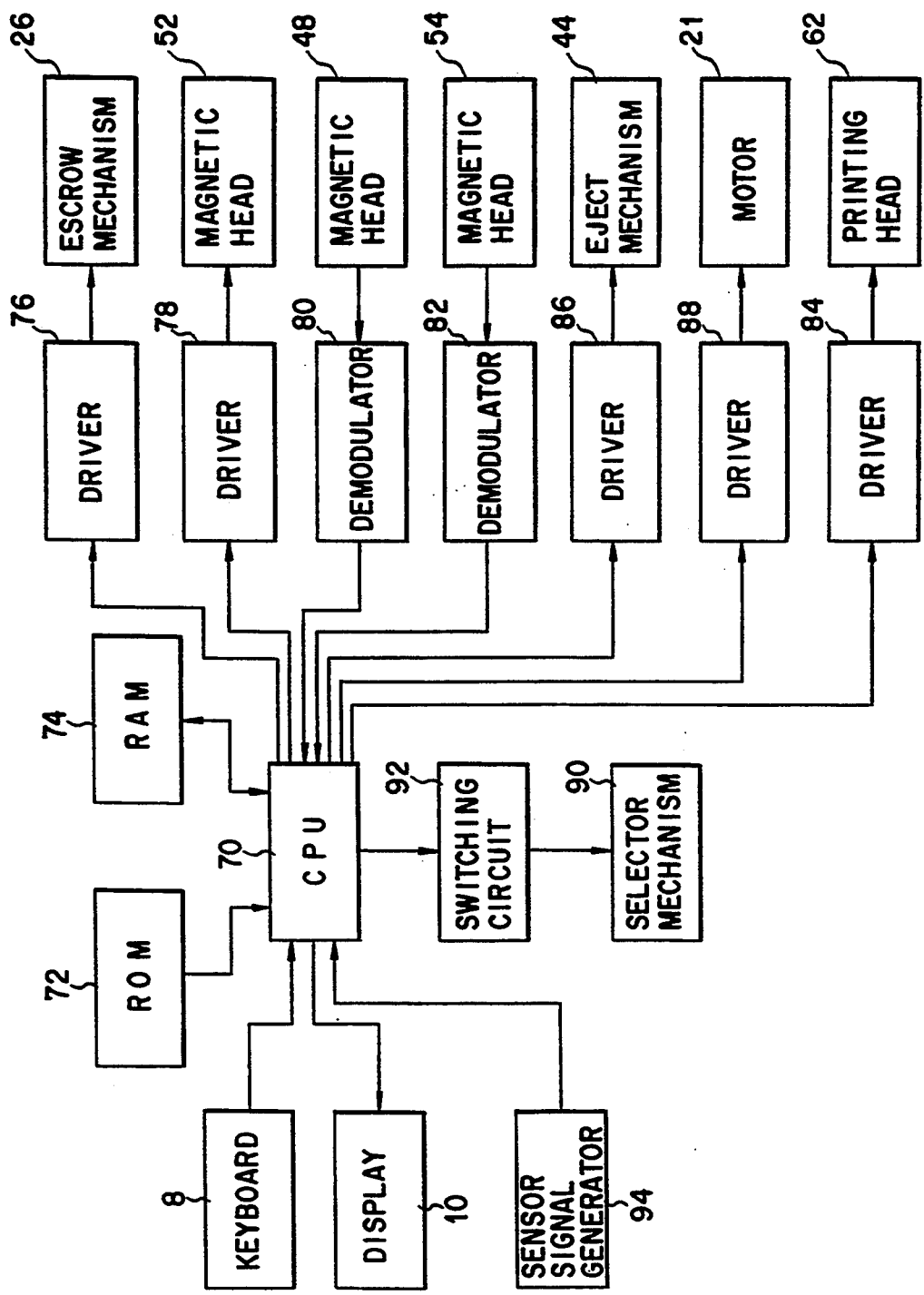
FIG. 4 is a block diagram showing a circuit of the passage ticket processing apparatus of FIG. 1.

The above-mentioned passage ticket processing apparatus comprises a controller as shown in FIG. 4. More specifically, a ROM 72 in which an input signal is inputted from the keyboard and a control program is stored, and a RAM 74 in which a toll table is stored are connected to a CPU 70 for controlling the entire apparatus. Also, a driver 76 for driving the escrow mechanism 26, a driver 78 for driving the magnetic head 52 for writing, demodulators 80 and 82 for demodulating data read from the magnetic heads 48 and 54 for reading, a driver 84 for driving the printing head 62, a driver 86 for driving the eject mechanism 44, a driver 88 for driving the main motor 21, and a switching circuit 92 for generating a driving signal to switch a selector mechanism 90 for selecting the position of the flapper 66 are connected to the CPU 70. Further, a sensor signal generator 94 for generating the outputs, which are sent from the sensors 46, 50, 60, 68, to the CPU 70 as a sensor signal, and the display 10 are connected to the CPU 70.

In the above controller, the CPU 70 provides a driving command to the drivers 86 and 88 in response to the ticket issue signal inputted from the keyboard 8 when the passage ticket is issued. Therefore, the eject mechanism 44 and the motor 21 are operated and the conveyance mechanism starts the transfer. As a result, the unused passage ticket 2 is ejected from the conveyer hopper 14 and the conveyer of the unused passage ticket is started. The passage ticket 2 is detected by the sensor 50, the sensor signal generator 94 generates a sensor signal based on the above detection, and the sensor signal is outputted to the CPU 70. Therefore, the CPU 70 provides a reading command for writing and confirming to the drivers 78 and 88. As a result, data such as car type data is written on the unused passage ticket 2 conveyered by the writing head, and data written by the reading head 54 is read. Then, read data is converted to digital data by the demodulator 82, and processed by the CPU 70, and the result of the comparison is displayed on the display 10. If the conveyered passage ticket 2 is detected by the sensor 60 of the printing mechanism 56, the detection signal is generated by the sensor signal generator 94. In response to the detection signal, the CPU 70 provides a printing command to the driver 84. Printing data such as entrance gate data is drawn from the RAM 74, and inputted to the driver 84 as printing data. As a result, the printing head 62 of the printing mechanism 56 is operated, and data of entrance gate is printed on the passage ticket. At the time of issuing the passage ticket, the CPU 70 provides a command for positioning the flapper 66 to the first position to the switching circuit 92.. Therefore, the selector mechanism 90 is operated by a switching signal sent from the switching circuit 92, and the flapper 66 is positioned to the first position. As a result, the conveyered unused passage ticket 2 on which data is printed is discharged to the discharge port 6. When the passage ticket is positioned at the discharge port 6, the signal generator 94 generates a sensor signal in accordance with the detection signal sent from the sensor 68.

Therefore, it is displayed on the display 10 that the unused passage ticket 2 is discharged to the discharge port 6. In accordance with the display, if the the passage ticket 2 is ejected from the discharge port 6, the signal generator 94 generates a sensor signal again, and the CPU 70 generates a command for enabling the eject mechanism 44 to operate in response to the signal. Under this state, if the ticket issue signal is inputted by the keyboard 8 again, the ticket issuing operation is executed similar to the above.

At the time of confirming the passage ticket, if the passage ticket 2 to be confirmed is inserted into the insertion port 4, the sensor 46 detects the insertion. A sensor signal is generated from the signal generator 94 in response to the detection, a command for generating a driving signal is provided to the drivers 88 and 76. In accordance with this command, the conveyance mechanism is operated, the conveyer ticket 2 is conveyed, and car type data is read from the passage ticket 2 by the reading head 48. Read data is converted to digital data by the demodulator 80, and processed by the CPU 70 to be displayed on the display 10. After the passage ticket 2 is passed through the reading head 48, the driver 76 is operated. The escrow mechanism 26 is then operated in accordance with the command from the CPU 70, the passage ticket 2 is not conveyered. While the passage ticket 2 is held stationary, the display on the display 10 is confirmed by the clerk. If it is judged that the display conforms to the actual type of the vehicle, the result of the judgment is inputted by the key board 8. In accordance with the input or after passing a fixed period of time after the display, the CPU 70 operates the driver 76 and releases the operation of the escrow mechanism 26. As a result, the passage ticket 2 is conveyed to the printing mechanism 56. When the conveyed passage ticket 2 is detected by the sensor 60 of the printing mechanism 56, the detection signal is generated from the sensor signal generator 94. In response to the signal, the CPU 70 provides a printing command to the driver 84, and print data of "RECEIVED" is drawn from the RAM 74 inputted to the driver 84 as print data. As a result, the printing head 62 of the printing mechanism 56 is operated, and print data of "RECEIVED" is printed on the passage ticket.

When the conveyer of the passage ticket 2 is held stationary, if it is judged that the display of the display 10 does not conform to the actual type of the vehicle, the result of the judgment is inputted by the key board 8. In accordance with the input or after passing a fixed period of time after the display, the CPU 70 operates the driver 76 and releases the operation of the escrow mechanism 26. As a result, the passage ticket 2 is conveyed and detected by the sensor 50, and the detection signal is generated by the sensor signal generator 94 and sent to the CPU 70. Therefore, the CPU 70 provides a writing command for data correction and a reading command for confirmation to the drivers 78 and 88. As a result, corrected car type data is written onto the passage ticket 2 conveyed by the writing head, and corrected data written by the reading head 54 is read. Read data is converted to digital data by the demodulator 82, processed by the CPU 70, and the comparison result is displayed on the display 10. When corrected data is still erroneous data, the CPU 70 provides a command for positioning the flapper 66 to the first position to the switching circuit 92 by the input of the keyboard 8. Therefore, the selector mechanism 90 is operated by the switching signal sent from the switching circuit 92, and the flapper 66 is positioned to the first position. As a result, the passage ticket 2 is passed through the printing mechanism 56, and guided to the discharge port 6 by the flapper 66 of the first position. In the case that the corrected display is correct, the conveyed passage ticket 2 is detected by the sensor 60 and print data of "RECEIVED" is printed on the passage ticket as explained above.

At the time of confirming the passage ticket, the CPU 70 provides a command for positioning the flapper 66 to the second position to the switching circuit 92 in accordance with the confirmation signal. Therefore, the selector mechanism 90 is operated by the switching signal sent from the switching circuit 92, and the flapper 66 is positioned to the second position. As a result, the unused passage ticket 2 on which data of "RECEIVED" is printed is guided by the flapper of the second position and stocked in the stacker 16.

The structure of the escrow mechanism 26 will be explained in detail with reference to FIGS.. 5 and 6.

Figure 5:
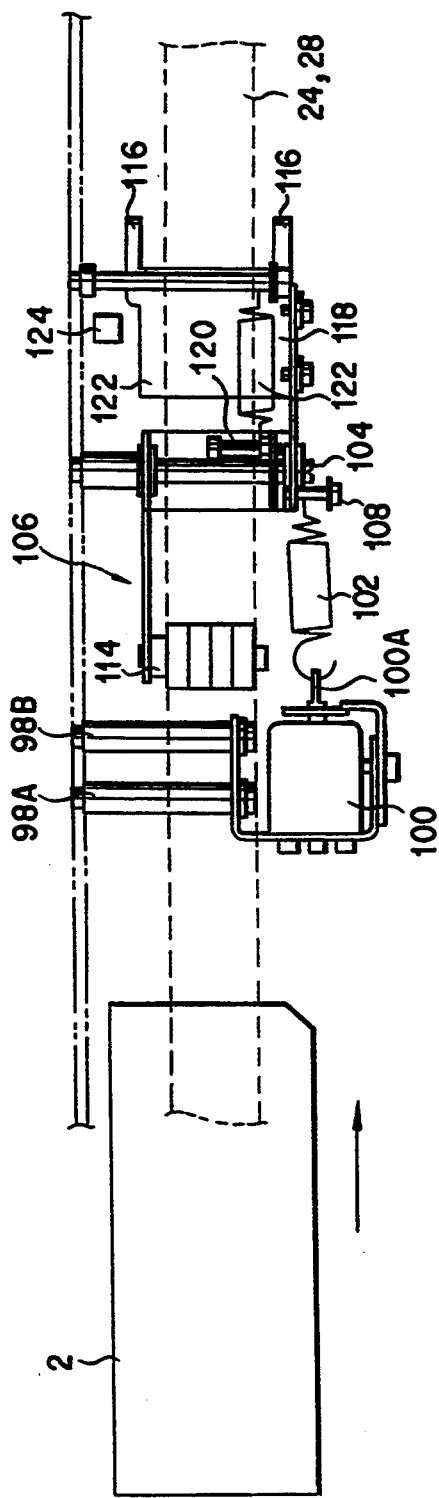
FIG. 5 is a plane view showing an escrow mechanism of the passage ticket processing apparatus of FIG. 1.
Figure 6:
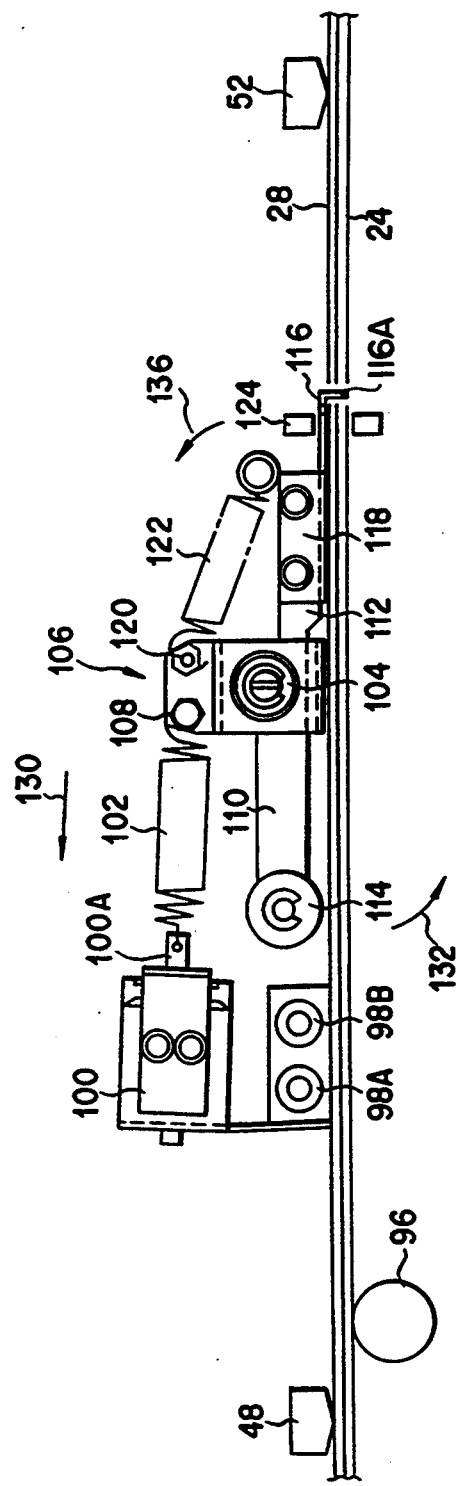
FIG. 6 is a side view showing the escrow mechanism of the passage ticket processing apparatus of FIG. 1.

The belts 24 and 28 contact each other. A rotary encoder 96 having a length which is longer than the width of the belts 24 and 28 is arranged on the lower surface of the conveyer belt 24. A pair of rollers 98A and 98B are arranged on the upper surface of the conveyer belt 28. The passage ticket 2 is transferred as being sandwiched between the belts 24 and 28. In FIG. 5, in order to clearly show the structure of the escrow mechanism 26, the belts 24 and 28 are shown by a broken line, and the state that the passage ticket is sandwiched between the belts 24 and 28 is omitted. In the escrow structure 26, a solenoid 100 is used as a driving source, and one end of the a driving spring 102 is coupled to a driving shaft 100A of the solenoid 100. The other end of the driving spring 102 is coupled to a rolling end 108 of a rolling element 106, which rolls (swings) around a rotary shaft 104. Arms 110 and 112 which roll in an opposite direction along the conveyer path together with the rolling element 106 are extended from the rolling element 106. A pressing roller 114 is rotatably attached to the top end of the arm 110 which is extended to the pair of rollers 98A and 98B. The pressing roller 114 presses the belt 28 onto the belt 24 such that the passage ticket 2 is surely sandwiched between the belts 24 and 28. A stopper 116 is fixed thereto through a fixing portion 118 so as to hold the conveyer of the passage ticket 2 stationary. A return spring 122 is provided between the fixing portion 118 and a rolling end of the rolling element 106. The stopper 116 is extended along the belts 24 and 28 at the outside of these belts, and a top end 116A is bent downward. Therefore, when the top end 116A enters the conveyer path, the passage ticket having a width larger than the width of the belt 24 or 28, is prohibited from being conveyed. The prohibition of the transfer of the passage ticket is detected by a sensor unit 124 such as a pair of optical sensors provided over the passage ticket whose conveyer is stopped by the stopper 116. The following arrangement is not always required. The pressing roller 114 may be arranged on the passage ticket, which is held stationary by the stopper 116 and the pressing roller 114 is pressed to the belt 28 so that pressing force is directly applied to the passage ticket 2. Therefore, the pressing roller 114 is arranged in the vicinity of the passage ticket 2 which is held stationary by the stopper 116. The belt 28 is pressed to the belt 24, and both belts contact each other, thereby causing the belt 28 to indirectly press the passage ticket 2 against the belt 24.

In the above-structured escrow mechanism 26, the passage ticket conveyed to reach the escrow mechanism 26 by the conveyer belts 24 and 28. In the escrow mechanism 26, the top end 116A of the stopper 116 enters the conveyer path. Due to this, the top end of the passage ticket 2 contacts the top end 116A of the stopper 116, and the passage ticket 2 resists conveyer force of the belts 24 and 28 and is held stationary at the position. Even if the holding state of the passage ticket 2 is maintained, the belts 24 and 28 are continually conveyed as being slid on the passage ticket 2. Therefore, it is needed that force of sandwiching the passage ticket 2 between the belts 24 and 28 be provided to the extent that the passage ticket is not broken.

While the passage ticket 2 is held stationary, the sensor 124 is operated to count the holding time of the passage ticket. If the holding time exceeds a predetermined time, the rotation of the motor for the transfer is stopped based on the command for stopping the transfer from the CPU 70, the conveyer of the belts 24 and 28 are stopped. Thereby, the passage ticket 2 is prevented from being worn more than it is required, so that the breakage of the passage ticket 2 can be avoided.

If car type data is confirmed by data sent from the passage ticket 2, a command for releasing the holding state of the passage ticket is outputted from the CPU 70. The solenoid 100 is operated based on the command. The driving shaft 100A is drawn by the actuation of the solenoid 100, and drawing force is transmitted to the rolling end 108 of the rolling element 106 through the driving spring 102 as shown by an arrow 130. Therefore, the rolling ends 108 and 120 are rolled around the rotary shaft 104 of the rolling element 106. Similarly, the pressing roller 114 is rotated around the rotary shaft 104 of the rolling element 106 as shown by an arrow 132. Therefore, at the time when the stopper 116 is released, the pressing roller 114 is pressed to the belt 24, so that the passage ticket 2 is surely sandwiched between the belts 24 and 28, and the conveyance of the passage ticket 2 can be ensured. Moreover, force of rotation of the stopper 116 is transmitted through a coil spring 122 and the arm 112 with the rolling of the rolling end 120, and the stopper 116 is rotated as shown by an arrow 136. Therefore, the state that the passage ticket 2 is held stationary by the stopper 116 is released, and the conveyer of the passage ticket is started. The speed of the belts 24 and 28 is detected by the rotary encoder 96. When the belt speed does not reach a predetermined value, the stopper 116 is not instantly removed from the conveyer path in response to the release command for releasing the hold state of the passage ticket even if the release command is outputted. In other words, even if the release command is outputted, the holding state of the passage ticket 2 is not released until the condition in which the passage ticket 2 is conveyed at the predetermined speed is set. That is, the holding state of the passage ticket 2 is substantially released at the time when the condition in which the passage ticket 2 is conveyed at the predetermined speed is set. Thereby, even if the writing or reading is performed by the reading head 52 or the writing head 54 after conveying the passage ticket 2, the writing or reading error can be prevented from being generated by the defectiveness of the conveying speed.

Figure 7:
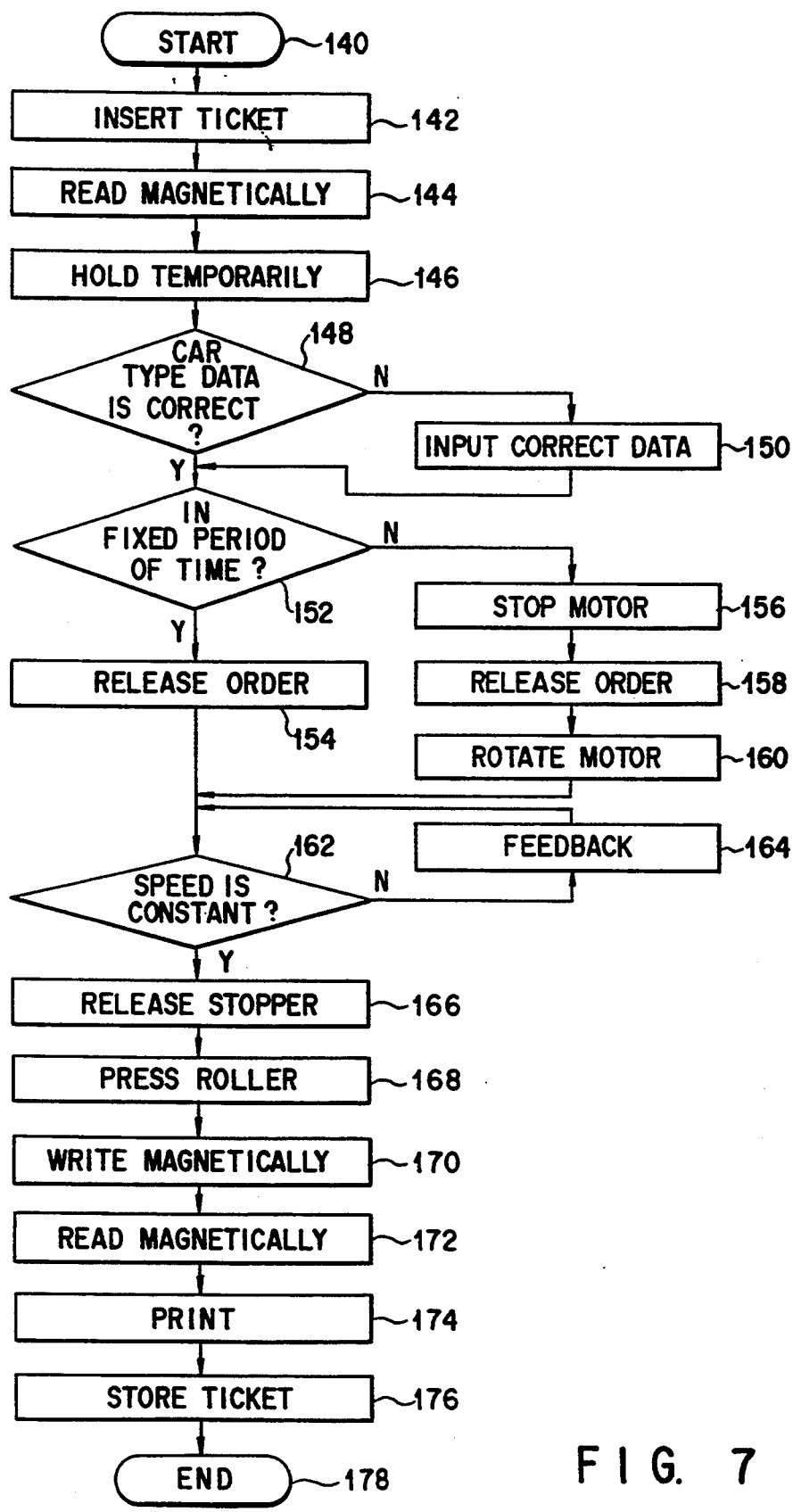
FIG. 7 is a flow chart showing an operation relevant to the escrow mechanism of the passage ticket processing apparatus shown in FIGS. 5 and 6.

The processing of CPU 70 relevant to the escrow mechanism 26 will be explained with reference to FIG. 7.

As shown in step 140, if the operation of the processing apparatus is started, the passage ticket 2 can be inserted into the insertion port 4. If the passage ticket 2 is inserted thereinto, magnetic data of the passage ticket 2 is read by the reading head 48 as shown in step 144. Thereafter, as shown in step 146, the passage ticket 2 is held stationary by the stopper 116 of the escrow mechanism 26. While the passage ticket 2 is held stationary, the clerk in charge confirms car type data from read data as shown in step 148. In step 150, if car type data is incorrect, corrected data is inputted by the clerk. CPU 70 discriminates whether or not a fixed period of time is passed after the passage ticket is temporarily held stationary. In step 156, if it is discriminated that the fixed period of time passed, the motor relevant to the transfer is stopped. Thereafter, if the release command is outputted from the CPU 70 in step 158, the motor is rotated again in step 160 and the transfer speed is detected by the rotary encoder 96. Then, in step 162, it is discriminated whether or not the conveyer speed reaches a predetermined value. Also, in step 154, even if it is discriminated that the release command is outputted before the fixed period of time is passed after the start of temporarily holding the passage ticket stationary, it is discriminated whether or not the conveyer speed reaches the predetermined value in step 162. The state that the passage ticket 2 is held stationary is not substantially released until the conveyer speed reaches the predetermined value. Then, the motor is feedback-controlled such that the conveyer speed reaches the predetermined value in step 164. If the conveyer speed reaches the predetermined value, the stopper 114 for holding the passage ticket stationary is released in step 166, and the passage ticket 2 is pressed onto the belts 24 and 28 in step 168. Thereafter, in step 170, if there is an error in car type data, corrected data is written onto the passage ticket 2 by the magnetic head 52, and data of the passage ticket 2 is read to confirm data by the reading head 54 in step 172. In step 174, "RECEIVED" is printed onto the passage ticket 2 in which correct data is written. In step 176, the passage ticket 2 is contained in the stacker 16, and a series of steps is ended in step 178.

According to the above-explained escrow mechanism 26, the sensor 124 is provided at the position where the passage ticket 2 is held stationary, the time for holding the passage ticket 2 stationary is counted. When the release command is not outputted within a predetermined time, the driving source such as a motor relevant to the transfer is stopped. Therefore, the passage ticket 2, which is held stationary by the stopper 114, is not broken by friction caused by belts 24 and 28. Also, the conveyer speed is detected by the rotary encoder 96. Then, if the conveyer speed does not reach the predetermined value, the stopper 114 is not released even if the release command is outputted. Therefore, even if the magnetic head is arranged at the lower stream side, no error occurs in reading or writing data by the magnetic head. Moreover, in starting the conveyer of the passage ticket again, the belts and the passage ticket can be surely conveyed at the same speed since the passage ticket 21 is surely sandwiched between the belts 24 and 28 by the pressing roller.

As explained above, according to the ticket processing apparatus, even if erroneous data is contained in the passage ticket issued at the entrance gate, erroneous data can be rapidly corrected at the exit gate.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for conveying a medium, comprising:
a conveyance mechanism having a pair of conveyer belts, said conveyance-mechanism conveying said medium along a predetermined conveyance path by holding said medium between said conveyer belts; and
a rotary member positioned near said conveyance mechanism, said rotary member having a stopper and a pusher spaced a predetermined distance apart from each other, said rotary member rotating about an axis located between said stopper and said pusher, said stopper stopping said medium conveyed by said conveyance mechanism when entering said conveyance path, and said stopper releasing said medium when retreating from said conveyance path, and said pusher pushing said conveyer belts to enhance a tension on said transfer belts when said stopper retreats from said conveyance path.

2. An Apparatus according to claim 1, further comprising:
means for detecting a conveyer speed of said conveyer mechanism; and
means for keeping said stopper from releasing said medium until said detecting means detects a predetermined value.

3. An apparatus according to claim 1, further comprising:
means for detecting a holding time in which said stopper holds said medium; and
means for stopping said conveyance of said conveyance mechanism when said detecting means detects a predetermined time.

4. An apparatus for processing a passage ticket carried by a driver of a vehicle and having vehicle data representing a type of said vehicle, said apparatus comprising:
means having a pair of conveyer belts for conveying said passage ticket along a predetermined conveyance path while holding said passage ticket between said conveyer belts;
means for reading said vehicle data from said passage ticket conveyed by said conveying means;
means for inputting correct data to correct said vehicle data read by said reading means;
a rotary member positioned near said conveyance mechanism, said rotary member having a stopper and a pusher spaced a predetermined distance apart from each other a, said rotating member rotating about an axis located between said stopper and said pusher, said stopper stopping aid passage ticket conveyed by said conveying means by entering said conveyance path, said stopper releasing said passage ticket to resume conveying said passage ticket by retreating from said conveyance path in response to said input of said inputting means, said pusher pushing said conveyer belts to enhance a tension on said transfer belts when said stopper retreats from said conveyance path; and
means for recording said correct data inputted by said inputting means onto said passage ticket conveyed by said conveying means to correct said vehicle data.

5. An Apparatus according to claim 4, further comprising:
means for detecting a conveyer speed of said conveyer mechanism; and
means for keeping said stopper from releasing said passage ticket until said detecting means detects a predetermined value.

6. An apparatus according to claim 4, further comprising:
means for detecting a holding time in which said stopper holds said passage ticket; and
means for stopping conveyance of said conveyance mechanism when said detecting means detects a predetermined time.

7. An apparatus according to claim 6, further comprising:
means for restarting said conveying means to convey said passage ticket based on said input of said inputting means.

8. An apparatus according to claim 4, further comprising:
means for detecting a holding time in which said stopper holds said passage ticket;
means for stopping conveyance of said conveyance mechanism when said detecting means detects a predetermined time;
means for restarting said conveying means to convey said passage ticket based on said input of said inputting means;
means for detecting a conveyer speed of said conveyer mechanism; and
means for keeping said stopper from releasing said passage ticket until said detecting means detects a predetermined value.

9. An apparatus for processing a passage ticket issued to a driver of a vehicle and having vehicle data representing a type of the vehicle, said apparatus comprising:
means having a pair of conveyer belts for conveying said passage ticket along a predetermined conveyance path while holding the passage ticket between said conveyer belts;

means for reading the vehicle data from said passage ticket conveyed by said conveying means;

means for displaying said vehicle data read by said reading means;

means for inputting correct vehicle data to correct vehicle data in accordance with said vehicle data displayed by said displaying means;

a rotary member positioned near said conveyance means having a stopper and a pusher spaced a predetermined distance apart from each other said rotary member rotating about an axis located between said stopper and said pusher, said stopper stopping said passage ticket conveyed by said conveyance means when entering said conveyance path, said stopper releasing said passage ticket when retreating from said conveyance path, said pusher pushing said conveyer belts to enhance a tension on said transfer belts when said stopper retreats from said conveyance path;

control means for retreating said stopper from said conveyance path and for pressing said pusher against said conveyer belts in response to said correct data input by said input means; and means for recording said correct data inputted by said inputting means onto said passage ticket conveyed by said conveying means to correct said vehicle data.

10. An Apparatus according to claim 9, further comprising:

means for detecting a conveyer speed of said conveyer means; and means for keeping said stopper from releasing said passage ticket until said detecting means detects a predetermined value.

11. An apparatus according to claim 9, further comprising:

means for detecting a holding time in which said stopper holds said passage ticket; and means for stopping conveyance of said conveyance means when said detecting means detects a predetermined time.

12. An apparatus according to claim 9, further comprising:

means for restarting said conveying means to convey said passage ticket based on said input of said inputting means.

13. An apparatus according to claim 9, further comprising:

means for detecting a holding time in which said stopper holds said passage ticket;

means for stopping conveyance of said conveyance mechanism when said detecting means detects a predetermined time;

means for restarting said conveying means to convey said passage ticket based on said input of said inputting means;

means for detecting a conveyer speed of said conveyer mechanism; and means for keeping said stopper from releasing said passage ticket until said detecting means detects a predetermined value.

* * * * *